United States Patent Office 3,641,217
Patented Feb. 8, 1972

3,641,217
POLYMERIC PHENONE PHOTOSENSITIZERS AND BLENDS THEREOF WITH OTHER POLYMERS
Franco Agolini, Wilmington, Del., assignor to E. I. du Pont de Nemours and Company, Wilmington, Del.
No Drawing. Filed June 23, 1969, Ser. No. 835,791
Int. Cl. C08f 29/12
U.S. Cl. 260—897 B   5 Claims

ABSTRACT OF THE DISCLOSURE

Improved polymeric photosensitizers based on acrylamido substituted phenones, useful for crosslinking polymers.

BACKGROUND OF THE INVENTION

Polymeric materials, including polyethylene, polypropylene and polymers prepared from polar vinylidene monomers are widely used for a variety of industrial applications. These materials, however, commonly suffer from various deficiencies including inadequate dimensional stability and resistance to permanent stress deformation, as well as low resistance to grease, oil and organic solvents.

It is known that many of these deficiencies can be cured or substantially improved by photocrosslinking. Such crosslinking can be facilitated by the use of photosensitizers such as homopolymers and copolymers of acryloxybenzophenone, as described in U.S. Pats. 3,214,492; 3,265,772 and 3,315,013.

In the use of such sensitizers, however, still another difficulty has emerged. It is observed that upon radiation of polymer blends to achieve either crosslinking or grafting, the degree of crosslinking throughout the treated article may be ununiform. It is believed that the polymeric sensitizers described in the patents referred to above undergo rearrangement to form a chelated structure which is an effective ultraviolet light absorber. Consequently, in relatively thick polymeric structures, the external portions of the structure may be transformed into a light absorbing moiety, and thereby screen subsequent radiation. Thus, in thicker structures, crosslinking of interior portions may be prevented, and in thinner structures, irradiation and the resulting crosslinking may take place at a substantially lower rate than would be desirable.

SUMMARY OF THE INVENTION

The instant invention provides photosensitizers for photocrosslinking of polymeric materials which overcome the disadvantages heretofore encountered.

Specifically, the instant invention provides light sensitizing polymers of a monomer having the structural formula:

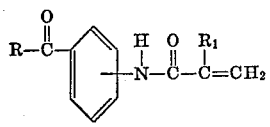

wherein R is selected from methyl and phenyl; $R_1$ is selected from hydrogen and methyl.

The instant invention further provides copolymers of from 0.01 to 10 mole percent of the above monomers with alpha olefins having from 2 to 4 carbon atoms. These copolymers, in addition to providing desirable formed structures by themselves, are particularly useful in the crosslinking of polyethylene and polypropylene, and there is accordingly also provided a crosslinked polymeric composition comprising a blend of the above copolymer and an alpha olefin selected from polyethylene and polypropylene wherein the copolymer comprises at least about from 0.1% of the blend.

The invention still further provides a crosslinked polymeric composition comprising a blend of a polymer of at least one polar vinylidene monomer having the formula

wherein $R^2$ is selected from one of the following groups:

$-Cl, -Br, -F, -CHO, -CN, -C_6H_5$

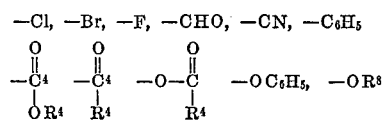

and

wherein $R^4$ and $R^5$ are each selected from the group consisting of alkyl and $-H$, $R^8$ is alkyl; and
wherein $R^3$ is selected from the group consisting of $R^2$, $H-$ and alkyl of 1 to 4 carbon atoms;
and at least 0.01 mole percent of polymer of a monomer having the structural formula:

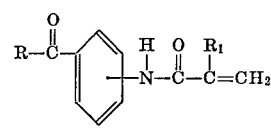

wherein R, and $R_1$ are as defined above.

There is also provided in accordance wtih the instant invention a process for crosslinking and grafting polymers which comprises intimately blending the polymeric photosensitizers and the polymer to be crosslinked and thereafter exposing the blend to radiation having a wavelength of about from 2,000 to 7,000 A.

DESCRIPTION OF THE PREFERRED EMBODIMENTS

The polymeric photosensitizers of the instant invention can be prepared through separate preparation of the monomers, prior to polymerization, or can be formed by a post-reaction synthesis. When the monomers are separately prepared, the phenone can be prepared from the corresponding 4-aminophenone.

The 4-aminobenzophenone can be synthesized by the method described by D. A. Denton and H. Suschitzky, Journal of the Chemical Society, October 1963, page 4741. The method involves reacting an aromatic amine, preferably in the form of its anilide, with an acylating agent such as benzoic anhydride in polyphosphoric acid at an elevated temperature for a prolonged period. Best yields are realized by using benzanilide as the starting compound with benzoic anhydride as the acylating agent and carrying out the reaction in polyphosphoric acid at 150° C. for 3 hours. Treatment of this reaction product with an acidic agent such as sulfuric acid converts the presumed dibenzanilide by rearrangement into the sulfate of the aminobenzophenone. The free amine is liberated by alkaline hydrolysis. The corresponding aminoacetophenone may be prepared by starting with acetaniline, using an acylating agent such as acetic anhydride or by rearranging diacetanilide by treating with an acidic agent such as hydrogen chloride or sulfuric by the procedure described by F. D. Chahaway, Journal of the Chemical Society 85, 386 (1904). The aromatic ring or rings of the aminophenone may carry other groups such as alkyl or halogen or other radicals so long as their inclusion does not interfere with the synthesis or with the photosensitizing function of the ultimate acrylamidophenones.

The desired acrylamidophenones are made by reacting the aminophenone with an acylating agent such as acryloyl or methacryloyl chloride by methods well known in the art.

The polymers of the instant invention can be prepared by subjecting the monomers, preferably in a solvent such as hexane, benzene, toluene, or tetrachloroethylene, to a temperature of −40° to 300° C. and a pressure of 1–3000 atmospheres in the presence of a catalyst for a contact time sufficient to form the polymers, usually at least 20 seconds for a continuous process and at least 3 minutes for a batch process, and then isolating the resulting polymer. When a copolymer of an alpha olefin is deesired, the polymerization can be carried out in an atmosphere of the desired comonomer, e.g., ethylene or propylene.

When high pressures are used, 800 atmospheres and above, a conventional peroxide such as di-tertiary-butyl peroxide or azo catalyst such as alpha,alpha′-azobisdicyclohexanecarbonitrile can be used and the temperature is preferably 25°–175° C.

It is believed that the essential feature of this type of catalyst, or "initiator," is that it is capable of generating free radicals. These free radical initiators, whether they be generated from a peroxide compound or from an azo-type compound combine with a polymerizable monomer to form a new free radical; the new free radical combines with another monomer molecule to form still another free radical; and this process is repeated until there is propagated a long polymer chain. Polymer chain growth terminates when the free radical-bearing polymer fragment encounters another free radical which, for example, can be another growing polymer chain or an initiator free radical.

Typical peroxides which release free radicals to function as initiators include benzoyl peroxide, di-tertiary-butyl peroxide, tertiary-butyl peracetate, di-tertiary-butyl peroxydicarbonate, 2,2-bis(tertiarybutylperoxy) butane, dimethyl dioxide, diethyl dioxide, dipropyl dioxide, propyl ether dioxide and propyl methyl dioxide. Organic hydroperoxides also applicable are, for example, tertiary-butylhydroperoxide, cumene hydroperoxide, ethyl hydroperoxide, and can be used to initiate polymerization of this kind. Combinations such as ammonium persulfate with a reducing agent can also be used. Typical azo compounds which decompose to liberate free radicals for initiation of polymerization include such catalysts as alpha,alpha′-azobisdicyclohexanecarbonitrile, alpha,alpha′ - azobisisobutyronitrile, triphenylmethylazobenzene, 1,1′-azodicycloheptanecarbonitrile, alpha,alpha′ - azobisisobutyramide, lithium azodisulfonates, magnesium azodisulfonate, dimethyl alpha,alpha′-azodiisobutyrate, alpha,alpha′-azobis-(alpha,gamma-dimethylvaleronitrile) and alpha,alpha′-azobis(alpha,beta-dimethylbutyronitrile).

Coordination catalysts can also be used to effect polymerization. The term "coordination catalyst" is understood to refer to compositions that are composed of:

(A) A compound containing at least one metal of the group consisting of metals of Groups IV*a*, V*a* and VI*a* of the Periodic Table, iron, cobalt, copper, nickel and manganese, said metal having directly attached thereto at least one substituent from the group consisting of halogen, oxygen, hydrocarbon and —O—hydrocarbon; and (B) A reducing compound selected from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeleef's Periodic Table of the Elements, 25th ed., Handbook of Chemistry and Physics, published by the Chemical Rubber Publishing Co. Specific examples of compound (A) include titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, and tetra(chloroethyl)-zirconate. Specific examples of compound (B) include phenyl magnesium bromide, lithium aluminum tetraalkyl, aluminum trialkyl, dimethyl cadmium, and diphenyl tin.

The polymerization is preferably carried out in a solvent medium. Solvents which have been found useful in the present invention hydrocarbons and halogenated hydrocarbons such as hexane, benzene, toluene, cyclohexane, bromobenzene, chlorobenzene, o-dichlorobenzene, tetrachloroethylene, dichloromethane and 1,1,2,2 - tetrachloroethane. Heterocyclic compounds such as tetrahydrofuran, thiophene and dioxane can also be used. The preferred solvents are the nonpolar and aromatic solvents, e.g. benzene, hexane, cyclohexane, dioxane, etc. In some instances, copolymerization may be effected without a solvent or in an emulsion or slurry system.

The copolymers of the instant invention can also be prepared by a post-reaction of the desired aminophenone with the acid chloride of the desired alkene/acrylic acid or methacrylic acid copolymer. This method of synthesis is fully described in Blatz et al., U.S. Pat. 3,441,545, hereby incorporated by reference.

The homopolymers of the instant invention have been found to be particularly effective in enhancing the photocrosslinking chracteristics of the polymers prepared from polar vinylidene monomers described above. The photosensitizing homopolymer prepared from the phenones in accordance with the instant invention should be intimately blended with the polar vinylidene polymer. This can be accomplished by thoroughly admixing the two substances in a mixing device such as a Banbury mixer or by the dissolution of the two polymers in a solvent compatible to both materials.

The ratio of the photosensitizing homopolymer to the polar vinylidene compound should be such that the final blend is composed of at least 0.01 mole percent, preferably at least 0.1 mole percent, of the sensitizing homopolymer, the remainder being the other polymer or polymers. Less than 0.01 percent of the stabilizer does not provide sufficient sites for crosslinking or grafting in the subsequent radiation step, and more than 10 mole percent does not provide sufficient improvement to warrant the use of the relatively expensive sensitizing homopolymer.

The photosenstizing copolymers of the instant invention can be used as such to form shaped articles or they may be used in blends with other polymers, preferably polymers of alpha-olefins such as polyethylene and polypropylene. The blends should contain at least 0.1 percent by weight based on the weight of the blend, preferably 5–50 percent of the photosensitizing copolymer, and the substituted phenone units must represent at least 0.01 mole percent, preferably 0.1–10 mole percent of the blend. Blending of the copolymers of the invention with other polymers can be accomplished by any of the conventional methods, e.g. rubber milling and agitating in a liquid medium.

The copolymers and polymer blends of the instant invention can be formed into various shaped articles such as self-supporting films, laminates, coatings, filaments and tubing. The shaped article is then exposed to radiation having a wavelength of 2,000–7,000 A., preferably ultraviolet radiation of 2,000–4,000 A., for a period of time sufficient to produce crosslinking, such period being at least 0.1 second under high energy xenon radiation but usually from 5 seconds to about 30 minutes under conventional radiation means, e.g. sunlamps, sunlight and the like.

After irradiation, besides exhibiting increased strentgh, the shaped articles of the invention display increased modulus (stiffness), improved resistance to grease and oil, increased resistance to stress-cracking and an improvement in their high temperature properties. The shaped articles, particularly the self-supporting films, find utility in packaging applications where high oil and grease resistance is required, i.e. containers for potato chips, bacon rind, etc. The shaped articles of the invention are also useful in industrial construction; for example, as protective sheeting that is resistant to "creep." Sheets containing the copolymers that had been exposed to radiation are also useful in photoreproduction processes.

In the following examples, which further illustrate the instant invention, parts and percentages are by weight. In these examples, Dynamic Zero Strength Temperature (abbreviated DZST) is determined according to ASTM-D-1430.

EXAMPLE 1

Part A.—Preparation of 4-acrylamidobenzophenone

In a vessel fitted with mechanical stirrer and thermometer there is placed 100 grams of benzanilide, 80 grams of benzoic anhydride and 800 grams of polyphosphoric acid. The reaction mixture is heated with stirring at a temperature of from 150 to 155° C. for 3 hours after which the mixture is cooled to 95° C. and then slowly added to one liter of water with stirring. The precipitate which forms is filtered and washed with further stirring in 40% sodium hydroxide solution (500 ml.) to take up any by-product benzoic acid. The mixture is filtered and the product hydrolyzed in a mixture of 60 ml. of concentrated sulfuric acid and 75 ml. of ethanol over a period of 2 hours. The mixture is poured into 500 ml. of water whereupon the amine sulfate is precipitated. The product is further washed with 500 ml. of ether to remove the ethyl benzoate and the remainder is then hydrolyzed in 500 ml. of 40% sodium hydroxide solution on a steam heater for one hour. The solid material is collected, washed with water and dried to give a yield of 61 grams of product, identified as 4-aminobenzophenone, having a melting point of 118–120° C.

To a solution of 20 grams of sublimed p-aminobenzophenone in 50 ml. of anhydrous dimethylacetamide, cooled with an ice-water bath, there is added dropwise 9.1 grams of freshly distilled acryloyl chloride over a period of 5 minutes. The reaction mixture is further stirred for approximately 25 minutes and is then precipitated by the addition of 150 ml. of water. The light yellow product is filtered, washed with water and dried, is then recrystallized from hot methanol and finally dried in an oven at 50° C. under reduced pressure. There is obtained 17 grams of a colorless product having a melting point of 143–144° C. An additional five grams of product is obtained by adding 10 ml. of water to the mother liquor. The product is identified as 4-acrylamidobenzophenone.

Elemental analysis.—Calculated for 4-acrylamidobenzophenone (percent): C, 76.47; H, 5.22; N, 5.57. Found (percent): C, 76.29; 75.51; H, 5.39, 5.44; N, 5.72, 5.64.

If the above procedure is repeated, using p-aminoacetophenone instead of p-aminobenzophenone, 4-acrylamidoacetophenone will be obtained as a product.

Part B.—Copolymerization of 4-acrylamidobenzophenone with ethylene

A solution of one gram of 4-acrylamidobenzophenone dissolved in 100 ml. of anhydrous benzene is placed in a pressure reactor along with 20 ml. of catalyst solution (1.5 ml. of tertiary butyl peracetate in 150 ml. of cyclohexane). The reactor is then pressured with ethylene to 2000 atmospheres and held at 140° C. until no more ethylene is absorbed. The reaction product is washed 3 times with 200 ml. of methanol and dried in an oven at 63° C. under reduced pressure. There is obtained 17.7 grams of copolymer having an inherent viscosity of 0.66 measured at a concentration of 0.5% in xylene at 120° C. The product contains 0.27% of nitrogen.

Part C.—Irradiation of copolymer

The copolymer prepared in Part B is milled into polyethylene (Alathon 15) to give a blend containing 0.5% photosensitizer. The blend is pressed into film having a thickness of 1.06 ml. Samples of the film are subjected to irradiation with a General Electric UA3, 300 watt medium pressure mercury vapor lamp at a distance of 3 inches from the film sample. The effect of the irradiation on the dynamic zero strength temperatures of the various samples is then determined. The results are shown in tabular form below:

| Exposure time (sec.): | DZST, ° C. |
|---|---|
| 0 | 103 |
| 5 | 129 |
| 10 | 157 |
| 20 | 216 |
| 30 | 218 |

The increase in DZST is indicative of photocrosslinking in the polymer film, and the increase in zero strength temperature is also correlative with improved heat sealing performance.

EXAMPLE 2

Example 1 is repeated, except that the film samples contain 0.4% of the photosensitizer and the thickness of the film is 1.03 mil. The results are shown below:

| Exposure time (sec.): | DZST, ° C. |
|---|---|
| 0 | 101 |
| 5 | 110 |
| 10 | 128 |
| 20 | 137 |
| 30 | 156 |

EXAMPLE 3

The procedure of Example 1 is again repeated, except that the concentration of the photosensitizer in the polymer blend is 0.3% and the film thickness is 1.079 mil. The results are shown below:

| Exposure time (sec.): | DZST, ° C. |
|---|---|
| 0 | 102 |
| 5 | 104 |
| 10 | 111 |
| 20 | 113 |
| 30 | 114 |

EXAMPLE 4

The copolymer prepared in Part B of Example 1 is formed into a self-supporting film and subjected to irradiation with a General Electric UA3, 300 watt medium pressure mercury vapor lamp at a distance of 3 inches from the film sample for a period of 30 seconds. The irradiated film exhibits increased resistance to grease and oil as well as increased dimensional stability, indicating that crosslinking has taken place.

If the above example is repeated, using a copolymer of 4-acrylamidoacetophenone or 4-methacrylamidobenzophenone, similar results will be obtained.

EXAMPLE 5

The 4-acrylamidobenzophenone prepared in Part A of Example 1 is polymerized to form a homopolymer and the resulting homopolymer mixed with a solution of polyvinyl acetate substantially as illustrated in Examples 1–8 of U.S. Pat. 3,265,772.

The resulting composition is formed into a film structure and irradiated for a period of 30 seconds as in Example 4. The resulting film is substantially insoluble in benzene, indicating the photocrosslinking has taken place.

I claim:
1. A crosslinked polymeric composition comprising a blend of
(A) an alpha olefin selected from polyethylene and polypropylene, and

(B) a copolymer of alpha olefin having from 2 to 4 carbon atoms and about from 0.01 to 10 mole percent of substituted phenone monomer having the structural formula

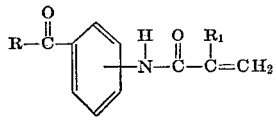

where R is selected from methyl and phenyl and $R_1$ is selected from hydrogen and methyl and wherein the copolymer comprises at least about 0.1% of the blend.

2. A process for crosslinking polyethylene or polypropylene which comprises intimately blending the polymer to be crosslinked and at least 0.1% of light sensitizing polymer of a substituted phenon monomer having the structural formula

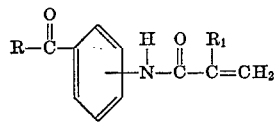

where R is selected from methyl and phenyl and $R_1$ is selected from hydrogen and methyl; and thereafter exposing the blend to radiation having a wavelength of about from 2,000 to 7,000 A.

3. A process of claim 2 wherein the radiation has a wavelength of about from 2,000 to 4,000 A.

4. A process of claim 2 wherein the polymeric blend is exposed to the radiation for a period of about from 0.1 seconds to about 30 minutes.

5. A process of claim 2 wherein the light sensitizing polymer is a copolymer which comprises about from 0.01 to 10 mole percent of the substituted phenone monomer and comonomer selected from alpha olefin having from 2 to 4 carbon atoms.

References Cited
UNITED STATES PATENTS 3,214,492 10/1965 Tocker.
3,265,772 8/1966 Tocker.

FOREIGN PATENTS 815,068 6/1969 Canada.

MURRAY TILLMAN, Primary Examiner

C. J. SECCURO, Assistant Examiner

U.S. Cl. X.R.

204—159.14, 159.2; 260—63